Aug. 8, 1944.  R. L. HARTER  2,355,434
HYDRAULIC OPERATOR
Filed April 4, 1941  4 Sheets-Sheet 1

INVENTOR.
ROBERT L. HARTER
BY

Aug. 8, 1944.   R. L. HARTER   2,355,434
HYDRAULIC OPERATOR
Filed April 4, 1941   4 Sheets-Sheet 2

INVENTOR.
ROBERT L. HARTER.
BY

Aug. 8, 1944. R. L. HARTER 2,355,434
HYDRAULIC OPERATOR
Filed April 4, 1941 4 Sheets-Sheet 3

INVENTOR.
ROBERT L. HARTER.
BY Ralph S. Binns.

Aug. 8, 1944.  R. L. HARTER  2,355,434
HYDRAULIC OPERATOR
Filed April 4, 1941  4 Sheets-Sheet 4

INVENTOR.
ROBERT L. HARTER.
BY Ralph S. Binns

Patented Aug. 8, 1944

2,355,434

UNITED STATES PATENT OFFICE 2,355,434

HYDRAULIC OPERATOR

Robert L. Harter, Cleveland, Ohio, assignor to Trabon Engineering Corporation, Cleveland, Ohio Application April 4, 1941, Serial No. 386,819

8 Claims. (Cl. 121—157)

My invention pertains to hydraulic operator apparatus for utilizing fluid pressure to produce reciprocating motion and power for various applications, and more particularly to improved valve mechanism where it is desired to secure reversal of flow of the hydraulic fluid received from a source of fluid under pressure.

Previously known hydraulic operators and valve mechanisms usually depend upon springs, balls or equivalent elements, and cams to complete the throw or travel of the valve past center, and under high pressure or with foreign matter in the system and under other conditions causing a sticky valve, the springs will fail to push the valve past center, resulting in failure of the device to function.

It is accordingly an object of my invention to provide a hydraulic operator and valve mechanism which will be reliable in operation, and which will be of an improved simplified construction.

It is also an object of my invention to provide an improved hydraulic operator and valve mechanism which is of an improved simplified construction eliminating springs, balls, cams and the like and which has reliable positive operating characteristics.

It is a further object of my invention to provide an improved valve mechanism for reversing the flow of fluid from a pressure source comprising a valve member of a generally cylindrical conformation and having an aperture extending axially therethrough, an inlet passage opening through a side wall of the valve member in a central portion thereof, two outlet ports opening through the side walls of the axial aperture into the valve member at points spaced on opposite sides of the center, outlet passages connecting from the outlet ports and extending through the side walls of the cylindrical valve member and opening from the opposite ends thereof, and two exhaust ports opening through the side walls of the cylindrical valve member at points between the outlet ports and the ends of the valve member.

Another object of my invention is to provide a flow reversing valve mechanism comprising such a valve member having in combination therein a pilot valve having a pair of valve heads joined together by a portion of a reduced diameter, the valve heads being of suitable diameters, lengths and spacing for sliding between two extreme positions in the axial aperture in the reversing valve and connecting the valve inlet passage selectively with either one of the outlet ports while also opening the remote exhaust port through the open end of the valve member.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of my invention, similar reference characters being applied to corresponding elements throughout, and in which:

Figure 1:
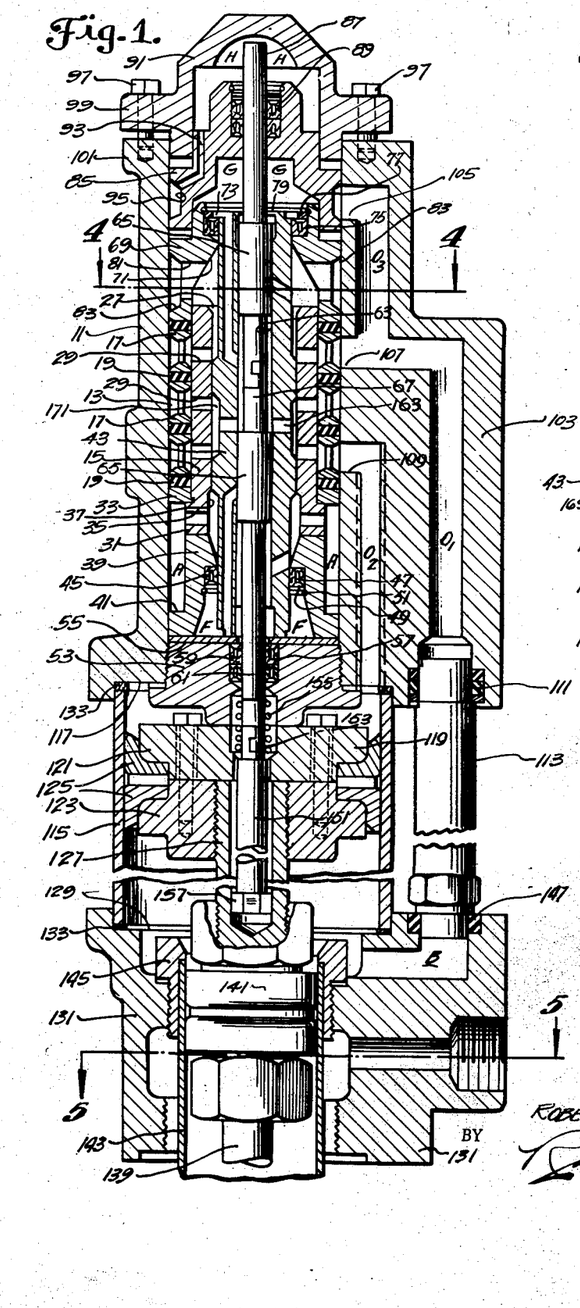
Fig. 1 is a longitudinal sectional view through an improved hydraulic operator and valve mechanism constructed in accordance with my invention.

Referring more specifically to Fig. 1 of the drawings, I have illustratively disclosed my improved valve mechanism in combination with a positive acting hydraulic operator which may be connected for applying power to operate a pump or any other similar device requiring reciprocating operation. As shown, the apparatus comprises a valve housing 11 of a generally cylindrical conformation, which may be a casting of any suitable metal, and which is provided with an aperture or bore 13 extending axially therethrough for enclosing and supporting the various elements of the valve mechanism in a proper cooperative relation.

Figure 8:
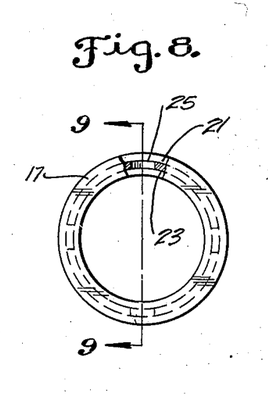
Fig. 8 is an end elevational view showing one of the sealing rings wherein the valve body is mounted.
Figure 9:
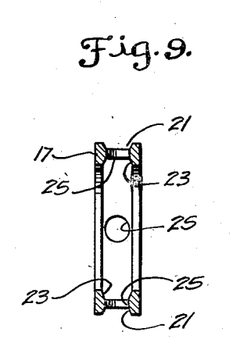
Fig. 9 is a cross-sectional view taken on line 9—9 as shown in Fig. 8.

Enclosed in the axial bore 13 in the valve housing is a tubular or cylindrical valve body 15 which has a smaller outside diameter than the bore. The valve body 15 is stationary and is concentrically supported in the bore by means of a plurality of sealing rings 17 which fit into the annular space between the valve body and the side walls of the valve housing wherein the rings are stacked and compressed together axially with packing rings 19 of resilient material squeezed therebetween in fluid flow restricting relation. As shown in detail in Figs. 8 and 9, each sealing ring 17 has an outer circumferential groove 21 and an inner circumferential groove 23 interconnected by a plurality of fluid conducting passages 25 which open through the web of the ring therebetween. Three similar sealing rings 17 of this conformation are utilized.

Figure 6:
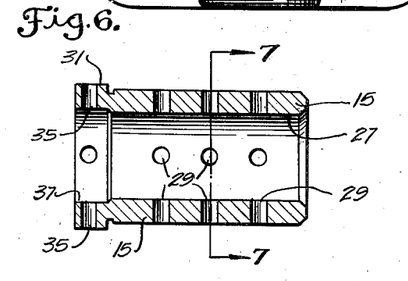
Fig. 6 is a longitudinal sectional view taken axially through the valve body.
Figure 7:
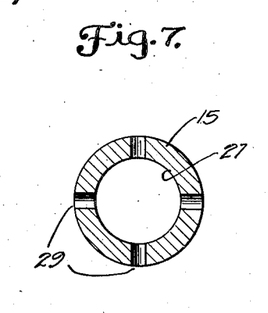
Fig. 7 is a cross-sectional view thereof taken on line 7—7 as shown in Fig. 6.

As shown in Figs. 6 and 7, the valve body 15 is provided with a bore 27 having fluid flow conducting passages 29 opening through the side walls and, as shown in Fig. 1, these are arranged in sets spaced circumferentially around the valve body and the different sets of passages being spaced axially for alignment and conductive connection with the inner grooves 23 of the respective sealing rings 17. The lower end of the valve body is provided with a flange 31 of slightly larger diameter which abuts upwardly against the lower sealing ring 33 which is solid. The flange on the lower end of the valve body also has a set of passages 35 opening radially therethrough, and the internal bore 27 in that portion of the valve body has an enlarged counterbore 37.

A lower valve body ring 39 is provided for abutting the lower end of the valve body 15 and holding it firmly in position in and against the sealing rings 17. The valve body ring 39, for the greater part, has an outside diameter which is smaller than the inside diameter of the bore 13 in the valve housing 11 in order to provide an annular fluid conducting passage A extending around therebetween and connecting with the outer ends of the passages 35 opening through the lower end of the stationary valve body 15. At the lower end, the valve body ring 39 has a flange 41 of such diameter as to fit into the bore 13 in the valve housing. A fluid flow reversing valve 43 of generally cylindrical conformation, is slidably disposed in the axial bore 27 of the stationary valve body 15 to control the flow of fluid therethrough, in a manner to be subsequently described. The lower valve body ring 39 is provided with an axially positioned aperture suitable to permit the lower end of the fluid flow reversing valve 43 to pass therethrough, and it is provided with an annular gland 45 holding a ring of U-shaped cross-section flexible packing 47 to seal on the smooth-finished end of the reversing valve which slides therethrough and forming a lower operating closure F for moving the reversing valve by hydraulic pressure. The packing 47 may be secured and compressed by a retainer ring 49 locked in place by a spring ring 51 seating in an annular groove, as will be understood.

The lower end of the bore 13 in the valve housing 11 is internally threaded and receives a head plug 53 for closing the lower end of the bore and the space F and for securing the valve body lower ring 39 up against the stationary valve body 15 to hold the latter up against the lower or solid sealing ring 33. A centrally apertured disk 55 may be provided on the upper side of the head plug 53 for compressing packing 57 into a packing gland 59 provided around the inner end of the axial aperture and sealing on a pilot valve rod 61 passing through the center of the plug. The pilot valve rod 61 passes up through the bore 63 which extends axially through the reversing valve 43 wherein it operates a pilot valve comprising a pair of heads 65 of fluid flow restricting diameters joined by rod portions 67 of reduced diameter which permits fluid to flow around therebetween. The rod portions 67 are joined together by interfitting projections. The valve heads of the pilot valve are of a suitable length and suitably spaced to cooperate with ports in the side walls of the flow reversing valve in a manner to be described.

On the upper end of the stack of sealing rings 17, a top sealing ring 69 is placed which is substantially longer axially and has the upper end of its internal bore 71 converging to a smaller diameter toward the upper end, where the diameter is suitable to permit the upper end of the reversing valve 43 to slide therethrough, sealed by packing 73 provided in a packing gland 75 formed in the upper side of the sealing ring. A retainer ring 77 compresses the packing and is locked in position by means of a locking ring 79 which springs outwardly into a groove, in a well known manner. The top sealing ring 69 also had radially extending passages 81 opening outwardly into a groove 83 extending circumferentially around the outside of the ring.

A top sealing dome 85 is provided which fits into the upper end of the bore in the valve housing 11 and presses down upon the top sealing ring 69. The sealing dome 85 rises in the central portion to provide an enclosed sealed space G to receive fluid under pressure to act upon the adjacent end of the reversing valve 43 for hydraulically operating the valve to the remote position. The upper end of the pilot valve rod 87 passes upwardly through an axial aperture in the top dome and is sealed by packing 89 in a suitable packing gland.

A valve housing cap 91 which fits into the upper end of the bore 13 in the valve housing, is domed in the center and extends upwardly therefrom to enclose a space H over and around the upper end of the pilot rod valve and packing gland. A passage 93 connects from the upper space H and passes down through the top cap 85 into a groove 95 extending circumferentially thereon, and from whence pressures are applied onto the uppermost end of the pilot valve rod 87. The cap 91 is clamped firmly down upon the sealing rings 17 in the valve housing as by screws 97 passing through a lateral flange 99 into a similar flange 101 provided on the upper end of the valve housing 11. Rings of soft packing material inserted between the lower end of the top cap and between all the sealing rings provide a tight seal which is formed when the top cap is drawn firmly down upon the valve housing by the screws, without the necessity for closing fitted metal parts.

Extending axially down one side of the valve housing casting, and integral therewith, is a protuberance 103 provided for enclosing fluid conducting passages, which may be formed therein in any suitable manner, as by drilling. By drilling radially into the valve housing through the protuberance, three fluid flow conductive passages or ports 105, 107 and 109 are provided opening respectively into the valve housing 11 at axially spaced positions connecting respectively into the outer circumferential groove 95 on the top sealing dome and into the uppermost and also the lower of the three similar sealing rings 17. Drilling from the upper end of the housing 11, a fluid passage $O_3$ is formed connecting between the upper and the intermediate ports 105 and 107. The outer ends of the radially and downwardly drilled apertures are then plugged in any suitable manner. Leading from the intermediate port 107, a passage $O_1$ is formed by drilling up from bottom of the protuberance where a suitable pipe fitting 111 is provided for connection with the upper end of a pipe 113. Drilling up from the lower end of the protuberance 103 a fluid passage $O_2$ is formed leading down from the bottom radial port 109 and opening downwardly.

A hydraulic cylinder shell 115 has the upper end seated into a large annular groove 117 formed in the lower end of the valve housing 11 concentric with the bore. The fluid outlet passage $O_2$ opening downwardly from the valve housing opens into the upper end of the hydraulic cylinder 115. Slidably disposed in the cylinder is a hydraulic piston 119 of any suitable construction. As shown, the piston may consist of a pair of piston disks 121 and 123 the adjacent outer edges of which are cut away to form grooves for receiving packing rings 125 of L cross section secured therein to make sealed contact with the walls of the cylinder. Apertures are provided disposed in axial alignment in the two piston disks and the lower aperture is internally threaded for threadably receiving the upper end of a piston rod 127 which extends down therefrom for operative connection with any pump or other device to be operated.

Figures 3, 5, 10:
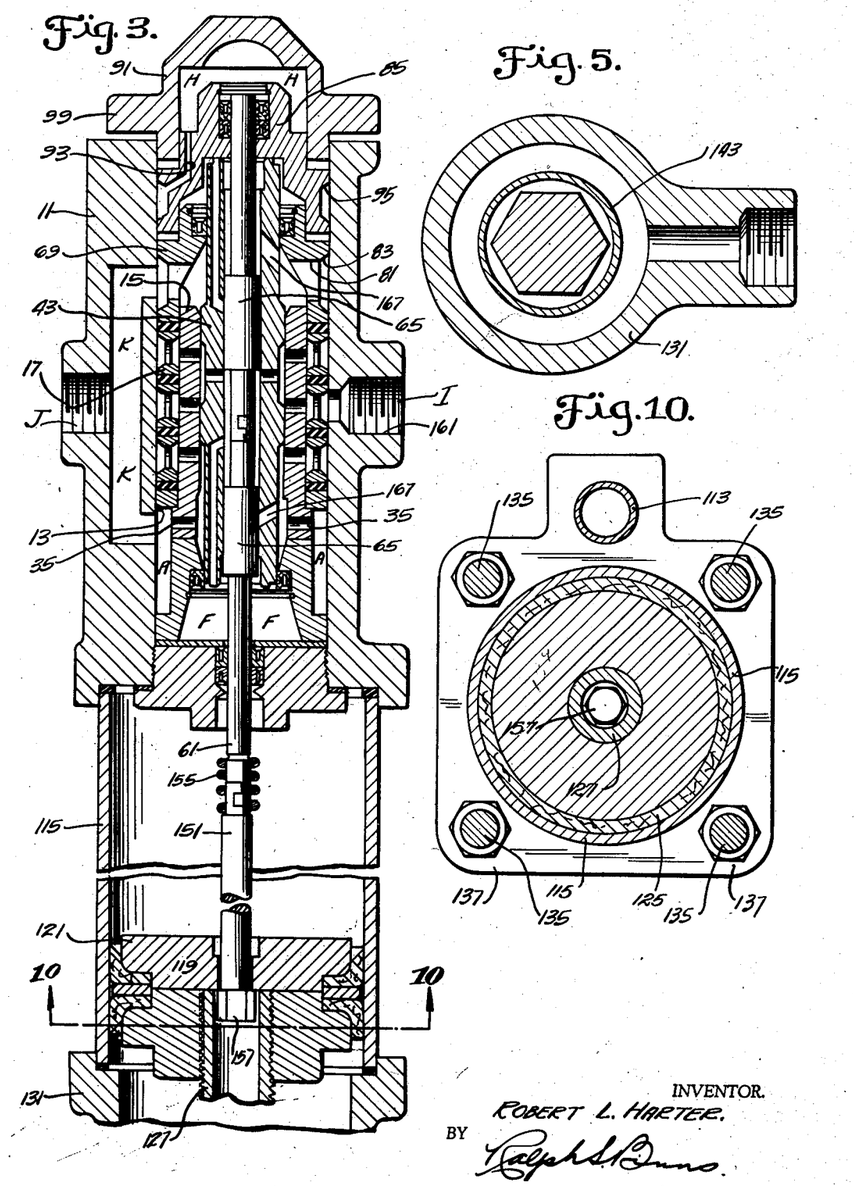
Fig. 3 is a sectional view similar to Fig. 1, but taken at right angles and showing the parts moved to an alternate extreme position.
Fig. 5 is a cross-sectional view taken on line 5—5 as shown in Fig. 1.
Fig. 10 is a cross-sectional view taken on line 10—10 as shown in Fig. 3.
Figure 4:
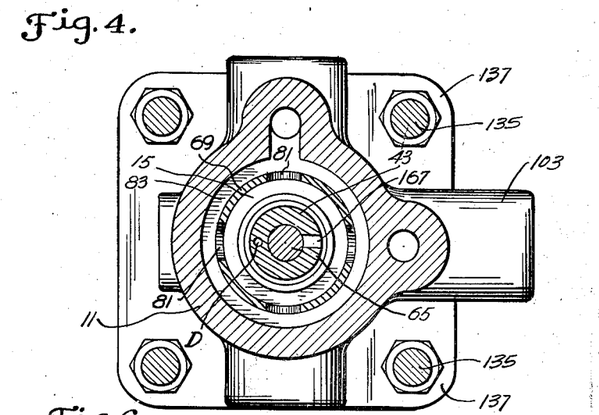
Fig. 4 is a cross-sectional view taken on line 4—4 shown in Fig. 1.

The lower end of the hydraulic cylinder shell 115 is seated in an annular groove 129 provided in a casing 131 which may be a part of a pump or other device to be operated. Resilient packing material 133 may be disposed at the ends of the cylinder shell 115 and when the valve housing 11 and the casing 131 are clamped firmly together thereon by bolts 135 passing through suitable flanges 137, as shown in Figs. 4 and 10, a fluid tight seal is formed. The lower end of the piston rod 127 is connected to the upper end of a smaller piston rod 139 through a coupling member 141 into which both rods are threadably secured. The coupling member 141 is adapted to slide snugly in a tubular member 143 secured at the upper end in a hollow retainer nut 145 which is externally threaded in the end of the lower cylinder casing 131 so that a fluid tight stuffing box is formed for extending the piston rod 127 of the hydraulic operator from the cylinder for operative connection with any device to be thereby actuated. The operator is here shown in conjunction with part of a barrel pump.

As previously described, the fluid outlet passage opening $O_1$ from the lower end of the valve housing is provided with any suitable pipe fitting connecting to the upper end of a pipe 113. The lower end of the pipe 113 is secured into a pipe fitting 147 in the lower casing 131 and connects thence by a passage B opening into the lower end of the hydraulic cylinder 115.

The piston rod 127 is hollow or tubular for a substantial distance down from the piston and receives slidably therein the lower end of a pilot valve operating rod 151. The upper end of the pilot valve operating rod 151 and the lower end of the pilot valve rod 61 have interfitting irregular projections 153 which are held together in interlocked relation by a helical spring 155 which is pulled over the interlocked joint, as shown in Fig. 1. The lower valve operating rod 151 and the hollow portion of the piston rod 127 are of suitable lengths so that the pilot valve is moved to its upper position just as the piston 119 attains its upper position. The lower end of the valve operating rod 151 is provided with a protuberance 157, such as a nut threaded thereon, for engagement with the piston disk 121 to pull the pilot valve down just as the piston approaches the lower end of its stroke.

The pilot valve operating rod 151 fits so loosely through the piston disk 121 and the hollow piston rod that hydraulic pressure enters from the upper end of the hydraulic cylinder. This tends to hold the pilot valve and rod in the upper position during the downward movement of the hydraulic piston, until finally it is positively pulled down by the piston.

As shown in Fig. 3 (a longitudinal sectional view similar to Fig. 1 but sectioned at right angles with the parts moved to an alternate position), an inlet port I is provided which opens through the side walls of the valve housing at a point substantially midway between the ends of the housing. The inner end of the inlet port I opens into the circumferential groove 21 on the outside of the middle ring 17 of the three identical sealing rings. The outer end of the inlet port consists of an enlarged counterbore 161 internally threaded to receive the threaded end of any suitable pipe (not shown) for connecting the hydraulic operator to any suitable source of fluid under pressure. Through the opposite side of the valve housing, an exhaust port J opens into a passage K which runs axially in the side wall of the housing. The ends of the exhaust passage K open inwardly through the side wall surfaces of the axial bore 13 in the valve housing 11 at suitable points for connecting into the outer groove 83 on the top sealing ring 69 and also into the annular space A provided around the valve body ring 39 in the lower end of the valve housing. The exhaust port J is internally threaded for convenient connection with a suitable pipe of the system (not shown) for returning to a reservoir the fluid exhausted by the hydraulic operator.

Returning to Figs. 1 and 2, I have shown my especially improved reversing valve member 43 which comprises a member of a generally cylindrical conformation having a cylindrical aperture or bore 63 passing axially therethrough. An inlet port 163 is provided which pierces the side wall of the cylindrical valve member substantially at the center and this may consist of a set or plurality of holes spaced around the center circumference of the valve. The valve inlet port holes 163 may be provided of any desired number and size to provide for the required fluid flow capacity.

Figure 2:
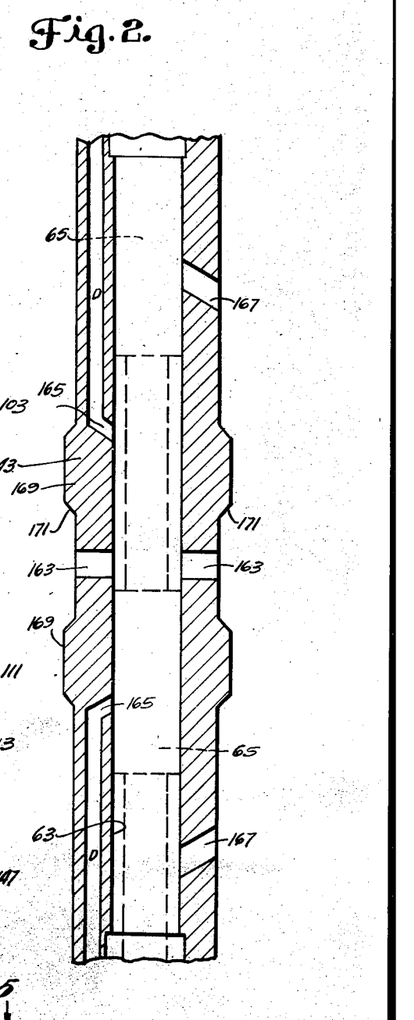
Fig. 2 is a fragmentary longitudinal or axial sectional view, enlarged, showing the special flow reversing valve member.

As shown, the cylindrical reversing valve member 43 is also provided with two outlet port holes 165 opening through the inner surface of the axial bore, at points spaced on opposite sides of the center, and an outlet longitudinal flow passage D connecting from each outlet port hole and passing longitudinally along through the side wall of the valve. Each passage D opens from the adjacent end of the cylindrical valve member 43 into an adjacent enclosed space G or F to discharge fluid under pressure for actuating the valve hydraulically in the opposite directions. Although only two outlet port holes 165 and passages D are shown, for clearness, it will be understood that any desired number may be conveniently provided for obtaining the required fluid flow capacity and rapidity of operation.

Two valve exhaust port holes 167 are also provided which, as shown, open through the side wall of the cylindrical valve member 43 at points between the outlet port holes 165 and the adjacent ends of the valve member. Any desired number and size of these exhaust port holes 167 may be conveniently provided.

A pair of raised beads 169 extend circumferentially around the outer surface of the valve member spaced apart axially at positions on opposite sides of the center and the inlet ports 163. The outside diameter of the reversing valve member 43 is slightly less than the inside diameter of the bore 27 wherein the valve slides so that fluid can flow freely along or around the valve except at the raised beads 169 which are of a suitable outside diameter to fit the bore in a snug fluid flow restricting relation. The space of smaller diameter between the two beads 169 forms an open groove 171 wherein fluid may flow freely around the valve from the inlet port I in the valve housing 11 to all the circumferentially spaced inlet passages 163 disposed around the center of the valve. Also the groove between the raised beads is extended axially sufficiently so that it is at all times in conductive connection through an adjacent set of holes 29 in the valve body 15 with the sealing ring groove 21 which connects from the inlet port I and in either extreme up or down position it selectively overlaps and connects with the next upper or lower sealing ring 17 respectively.

The enlarged counterbore 37 in the lower end of valve body 15 provides a constant connection between the exhaust port holes 167 in the adjacent end of the valve and the lower set of holes 35 in the stationary valve body.

The two heads 65 of the pilot valve (shown dotted in Fig. 2) are of a suitable diameter for sliding in snug fluid flow restricting relation in the axial bore 63 in the cylindrical reversing valve. Also the pilot valve heads 65 are so spaced by the interconnecting part 67 of smaller diameter and are of such suitable lengths that when the pilot valve is up and the reversing valve member 43 is down, as shown in Fig. 1, the inlet port holes 163 in the middle of the valve are connected with the outlet holes 165 and passages D in the upper portion of the valve. As previously explained, the inlet holes 163 are continuously connected with the inlet port I in the valve housing hence hydraulic fluid pressure is therein applied at all times. Therefore fluid flows up in the space between the two pilot valve heads 65 passing out through the outlet hole 165 and passage D into the space G enclosed above the upper end of the reversing valve, forcing the valve down to its lower extreme position. This operation has just taken place as shown in Fig. 1, with pilot rod ready to be pulled down when piston 119 completes its stroke.

In the down position of the reversing valve 43 the space or groove 171 between the two raised beads 169 is positioned so as to connect down into the sealing ring 17 below the middle ring which at all times receives fluid from the housing intake port I. As a result, hydraulic pressure is applied through port 109 and through the outlet passage O2 in the valve housing into the upper end of the hydraulic cylinder 115. Pressure thus applied on the upper side of the hydraulic piston 119 forces it down and fluid is exhausted from under the piston passing up through the pipe 113 and the other outlet passage O1 into the upper end of the valve housing, thence through the upper one of the three similar sealing rings 17, through the adjacent set of holes 29 in the stationary valve body 15, up inside the bore 27 thereof and around the upper end of the reversing valve 43, and then outward through the apertures 81 in the large top sealing ring 69 and down the exhaust passage K and out the exhaust port J. Pressure applied in the upper end of the cylinder 115 also enters hollow piston rod 127, and reacts upon lower end of valve rod 151 in an upward direction. At the same time pressure in space G acting upon upper pilot valve lobe 65 on stem 87 results in a downward reaction equal to the upward reaction on valve rod 151, because the pressure in the two spaces is equal and the difference in cross sectional area between lobe 65 and stem 87 is equal to the cross sectional area of valve rod 151. Thus the pilot valve is in hydraulic balance, and is held in position by the friction of packing 57 and 89.

As the hydraulic piston 119 approaches the lower end of the stroke, it strikes the enlarged nut 157 on the lower end of the pilot valve operating rod 151 which pulls the pilot valve down. This movement of the pilot valve closes the connection between the inlet port holes 163 in center of the cylindrical reversing valve 43 and the upper outlet passage D in the upper end of the valve. Also this opens the alternate connection through the lower outlet passage D down through the bottom of the reversing valve, and opens the upper valve exhaust port 167 and closes the lower valve exhaust port 167. Hydraulic fluid pressure is then admitted into the closed space F at the lower end of the valve 43 causing it to be moved to its extreme upper position, as shown in Fig. 3. Hydraulic fluid then flows from the intake port I into the valve housing, through the middle one of the three similar sealing rings 17, up around the reversing valve 43, out from the next higher sealing ring, down through the outlet passage O1 and the pipe 113 into the lower end of the hydraulic cylinder 115. The hydraulic piston 119 is then forced up and fluid is exhausted from above through the outlet passage O2 up into the valve housing 11, through the lower sealing ring 17, into valve bore 27 and passage around the lower end of the valve 43 and through passages 35 then through the annular space A around lower end of the valve body 15 and thence out of the connected exhaust passage K and port J in the valve housing. While hydraulic piston 119 is moving upwardly, hydraulic pressure passes through passage O3, port 105, annular groove 95 and passage 93 in the top sealing dome 85 into space H, and reacts upon upper end of pilot valve rod 87 in a downward direction. This downward thrust is balanced by the resulting upward reaction of the hydraulic pressure in space F acting upon the difference in cross sectional area between lower lobe 65 and lower pilot valve stem 61. Thus the pilot valve is in hydraulic balance and is held in place by the friction of packing 57 and 89.

So long as hydraulic pressure fluid is supplied under pressure into the inlet port I in the valve housing, this sequence of operations is repeated continuously, the simple reversing valve mechanism 43 operating in a positive manner to move fully between its two extreme positions, and the hydraulic piston 119 is operated to apply power to any device to be operated.

Figure 11:
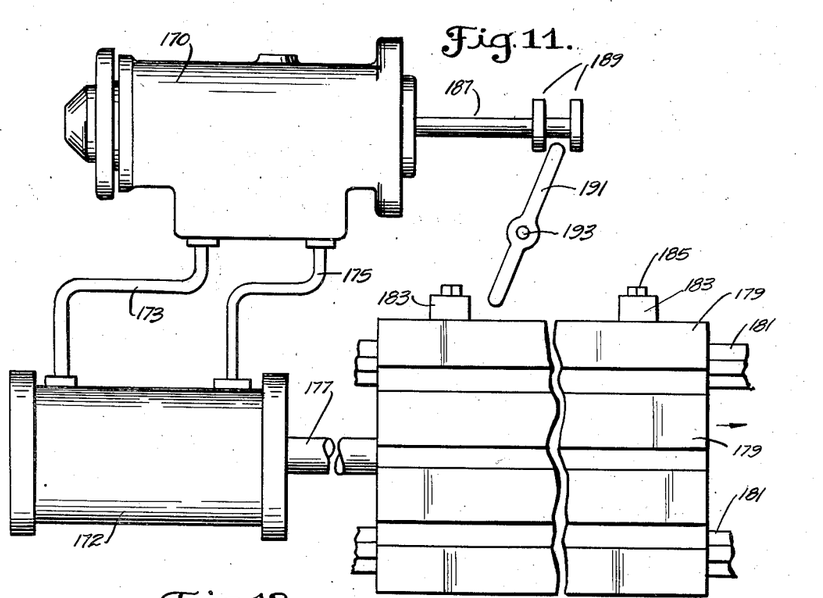
Fig. 11 is a plan view showing another application of my improved flow reversing valve mechanism.

My improved simplified positive acting reversing valve mechanism may also be utilized advantageously in various other different arrangements. In Fig. 11, I have shown my improved reversing valve mechanism 170 disposed in separated relation from a hydraulic operator 172 to be thereby controlled. In this arrangement pipes 173 and 175 are provided connecting from the two outlet passages of the valve housing 170 for supplying the hydraulic pressure fluid alternately from the valve housing inlet port into opposite ends of the operator cylinder 172 while simultaneously connecting the other or exhausting end of the cylinder back through the exhaust port of the valve housing.

In this arrangement, as shown, the piston rod 177 from the hydraulic cylinder is connected to a work carrying bed 179 of a metal working machine, such as a planer for example, which slides to and fro on guide rails 181.

For reversing the pilot valve in the valve housing 170, as the planer bed 179 moves to each extreme position, a pair of stops 183 are adjustably mounted on the planer bed in suitable spaced positions, as by bolts 185, in accordance with the desired movement of the planer bed. The outer end of the pilot valve operating rod 187 is extended and is provided with a pair of disks 189 secured thereon in suitable spaced relation for receiving one end of an operating lever 191 which is journalled on a fixed pivot 193 in such a manner that the other end of the lever is struck by either one or the other of the stops on the planer bed just as it approaches the end of its traverse. When the work carrying bed 179 is moving in the direction indicated by the arrow, a stop 183 strikes the adjacent end of the pivoted lever 191 causing the other end to push the pilot valve operating rod 187 to the left in the valve housing 170. The connections are so established from the valve housing that hydraulic pressure fluid is then admitted into the right-hand end of the cylinder 172. The planer bed 179 is then drawn to the left until the other stop 183 strikes the end of the lever 191 and moves the pilot valve operating rod 187 to the right in the valve housing, and this operation is repeated so long as hydraulic fluid under pressure is supplied.

Figure 12:
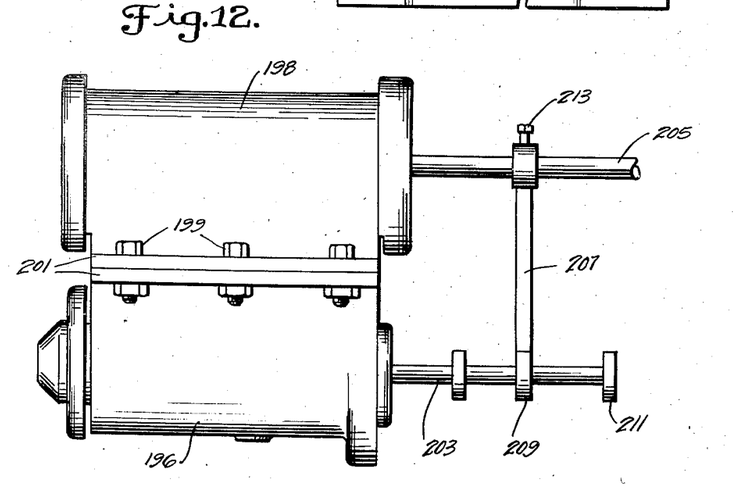
Fig. 12 is a side elevational view showing another installation wherein my improved valve mechanism may be effectively utilized.

In Fig. 12 I have shown another embodiment of a hydraulic apparatus wherein my improved reversing valve mechanism unit may be advantageously utilized. In this unit a valve housing 196 and a hydraulic cylinder 198 are secured together as a unit in a side-by-side arrangement as by passing clamping bolts 199 through flanges 201 provided along the adjacent sides thereof. As will be readily understood, the interconnecting passages are formed to open in aligned relation between the two parts so that connection is provided when these two housings are bolted together.

The valve housing 196 and the hydraulic cylinder 188 are joined in side-by-side relation with the pilot valve operating rod 203 and piston rod 205 extending in spaced parallel relation and both pass through the apertured ends of a cross-connecting bar 207. One end of the cross-connecting bar 207 slides freely on the pilot valve operating rod 203 between a pair of disks 209 and 211 which are secured firmly in suitable spaced relation on the rod. The other end of the cross bar 207 is secured adjustably and firmly to the piston rod as by a set screw 213. The piston rod 205 of the hydraulic operator is extended to any device to which reciprocating motion and power is to be supplied, and as it operates to and fro it throws the pilot valve operating rod 203 to either extreme position for repeating the operation so long as fluid is supplied under sufficient pressure to operate the hydraulic cylinder and perform the work desired.

Also it will be understood that such apparatus may be utilized for the purpose of providing reversal of flow of the hydraulic fluid received from the pressure source whenever it may be desirable to utilize such reverse flowing fluid in a system. When used for such a purpose the piston and piston rod of the hydraulic operator part of the apparatus is not extended and connected for applying power to any other device and may be smaller as it then merely serves the purpose of operating the pilot valve.

It is apparent that within the scope of the invention, modifications and different arrangements may be made other than herein disclosed, and the present disclosure is illustrative merely, the invention comprehending variations thereof.

I claim:

1. A flow reversing valve mechanism comprising a housing having a central chamber and end chambers, a valve reciprocable in said central chamber with its end portions being movable into said end chambers, and a valve rod reciprocable in said valve and extending thru said end chambers, said housing having an inlet passage and outlet passages communicating with said central chamber, said valve having fluid sealing engagement with the walls of said central chamber and having an exterior recess for connecting said inlet passage alternately with said outlet passages, said valve having an opening connecting its central interior portion with said recess at all times, longitudinal passages extending from said central portion through its ends to said end chambers and exhaust passages between the ends of the longitudinal passages for connecting said end chambers with said housing outlet passages, said valve rod including spaced heads having fluid sealing engagement with the walls of said valve and providing therebetween a fluid space in the central portion of said valve connectable alternately with said longitudinal passages, each head being of sufficient axial extent successively to control the adjacent longitudinal passage and exhaust passage during one stroke of the rod by closing one of said passages while maintaining the other of said passages closed and then opening the latter passage, the exhaust passage from each end chamber being open during the first part of the movement of the rod into that chamber.

2. A flow-reversing valve mechanism comprising a housing having a cylindrical chamber and a central inlet passage and side outlet passages communicating therewith, an open ended, hollow valve slidably engaging the inner walls of said chamber, said valve having an opening connecting its central interior portion with said inlet passage at all times, and longitudinal passages connecting each end of the valve with said central interior portion and exhaust passages through the valve side wall between the ends of the valve and the inlet ends of said longitudinal passages, said valve having an exterior, annular groove of sufficient axial length to connect said inlet passage with one or the other of said outlet passages, a valve rod having sealing heads slidably engaging the inner surface of said valve, each head being of sufficient axial length to close the inlet of either the adjacent longitudinal passage or exhaust passage, the space between said heads being of sufficient axial length to connect the said inlet passage with either of said longitudinal passages, the assembly of the said housing, valve and rod defining fluid retaining chambers at each end of the valve, the said rod being movable axially toward one of said chambers while the exhaust passage therefrom is open.

3. A flow-reversing valve mechanism comprising a housing having a cylindrical chamber and a central inlet passage and side outlet passages communicating therewith, an open-ended, hollow, cylindrical valve in said chamber, said valve having an opening through its wall connecting its central interior portion with said inlet passage at all times and longitudinal passages connecting each end of the valve with said central interior portion thereof and exhaust passages through the valve side wall between the ends of the valve and the inlet ends of said longitudinal passages, said valve having axially spaced fluid sealing annular ribs slidably engaging the walls of said chamber and defining a groove of sufficient axial length to connect said inlet passage with one or the other of said outlet passages, a valve rod in said valve and having axially spaced, cylindrical, fluid sealing heads thereon slidably engaging the inner surface of said valve, each head being of sufficient axial length to close the inlet of either the adjacent longitudinal passage or exhaust passage, the space between said heads being of sufficient axial length to connect the said inlet opening to the central portion of the valve with either of said longitudinal passages, the assembly of the said housing, valve and rod defining fluid retaining chambers at each end of the valve, the said rod being movable axially toward one of said chambers while the exhaust passage therefrom is open.

4. A flow-reversing valve mechanism comprising a housing having a cylindrical chamber and a central inlet passage and side outlet passages communicating therewith, an open ended, hollow valve slidably engaging the inner walls of said chamber, said valve having an opening connecting its central interior portion with said inlet passage at all times, and longitudinal passages connecting each end of the valve with said central interior portion and exhaust passages through the valve side wall between the ends of the valve and the inlet ends of said longitudinal passages, said valve having an exterior, annular groove of sufficient axial length to connect said inlet passage with one or the other of said outlet passages, a valve rod having sealing heads slidably engaging the inner surface of said valve, each head being of sufficient axial length to close the inlet of both of the adjacent longitudinal passage and exhaust passage at one time, the space between said heads being of sufficient axial length to connect the said inlet passage with either of said longitudinal passages, the assembly of the said housing, valve and rod defining fluid retaining chambers at each end of the valve, the said rod being movable axially toward one of said chambers while the exhaust passage therefrom is open, and means for reciprocating said rod in said valve and thereby opening and closing the said longitudinal and exhaust passages and causing opposite axial movement of the valve.

5. A flow-reversing valve mechanism comprising a housing having a cylindrical chamber and a central inlet passage and side outlet passages communicating therewith, an open ended, hollow valve slidably engaging the inner walls of said chamber, said valve having an opening connecting its central interior portion with said inlet passage at all times, and longitudinal passages connecting each end of the valve with said central interior portion and exhaust passages through the valve side wall between the ends of the valve and the inlet ends of said longitudinal passages, said valve having an exterior, annular groove of sufficient axial length to connect said inlet passage with one or the other of said outlet passages, a valve rod having sealing heads slidably engaging the inner surface of said valve, each head being of sufficient axial length to close the inlet of either the adjacent longitudinal passage or exhaust passage, the space between said heads being of sufficient axial length to connect the said inlet passage with either of said longitudinal passages, the assembly of the said housing valve and rod defining fluid retaining chambers at each end of the valve, the said rod being movable axially toward one of said chambers while the exhaust passage therefrom is open, and hydraulic means for reciprocating said rod in said valve including fluid connections to said side outlet passages.

6. A fluid-flow-reversing valve mechanism comprising a housing having a central chamber and end chambers axially alined with and communicating with the central chamber, said end chambers being greater in diameter than said central chamber, said housing having inlet and outlet passages communicating with said central chamber, a valve slidably engaging the walls of said central chamber with fluid sealing engagement and movable to bring its ends into the end chambers and out of contact with their outer walls, said valve having an exterior recess for connecting said inlet passage alternately with said outlet passages, said valve having an axial opening therethru and an opening thru its wall for connecting the axial opening with said recess at all times, said valve also having longitudinal passages in the valve wall from each end of the valve to and opening into the central portion of the axial opening thereof and exhaust passages thru the valve wall between the ends of the longitudinal passages, and a rod extending thru said valve and end chambers and having axially spaced elongated heads thereon, said heads slidably engaging the inner surface of the valve with fluid sealing engagement and defining walls of a space for fluid in the central portion of the valve connectable alternately with said longitudinal passages, each head being of sufficient axial length to close the adjacent longitudinal and exhaust passages in one position of the rod in the valve.

7. A fluid-flow-reversing valve mechanism comprising a housing having a central chamber and end chambers axially alined with and communicating with the central chamber, a valve slidably engaging the walls of said central chamber with fluid sealing engagement and movable to bring its ends into the end chambers, said valve having an axial opening therethru and also having longitudinal passages in the valve wall from each end of the valve to and opening into the central portion of the axial opening thereof, and exhaust passages thru the valve wall between the ends of the longitudinal passages, and a rod extennding thru said valve and end chambers and having axially spaced elongated heads thereon, said heads slidably engaging the inner surface of the valve with fluid sealing engagement and defining walls of a fluid space in the central portion of the valve connectable alternately with said longitudinal passages, each head being of such length as to close the adjacent longitudinal and exhaust passages in one position of the rod in the valve and to open one of those passages while maintaining the other one closed in another position of the rod in the valve.

8. A fluid-flow-reversing valve mechanism comprising a housing having a central chamber and end chambers axially alined with an communicating with the central chamber, a valve slidably engaging the walls of said central chamber with fluid sealing engagement and movable to bring its ends into the end chambers, said valve having an axial opening therethru and longitudinal passages in the valve wall from each end of the valve to an opening into the central portion of the axial opening and exhaust passages thru the valve wall between the ends of the longitudinal passages, and a rod extending thru said valve and having axially spaced elongated heads thereon, said heads slidably engaging the inner surface of the valve with fluid sealing engagement and defining walls of a fluid space in the central portion of the valve connectable alternately with said longitudinal passages, each head being of such length as to close the adjacent longitudinal and exhaust passages in one position of the rod in the valve and to close either of said passages while opening the other passage in other positions of the rod in the valve.

ROBERT L. HARTER.